C. R. HOPKINS.
SHIFTING MECHANISM.
APPLICATION FILED NOV. 11, 1914.

1,173,576.

Patented Feb. 29, 1916.
2 SHEETS—SHEET 2.

Witnesses
Harry King.
M. E. Rathvon

Inventor
Charles R. Hopkins
By
Attorneys

UNITED STATES PATENT OFFICE.

CHARLES R. HOPKINS, OF DOBBIN, WEST VIRGINIA, ASSIGNOR TO BURTON WILSON, OF MILL CREEK, WEST VIRGINIA.

SHIFTING MECHANISM.

1,173,576.   Specification of Letters Patent.   Patented Feb. 29, 1916.

Original application filed April 8, 1914, Serial No. 830,426. Divided and this application filed November 11, 1914. Serial No. 871,466.

*To all whom it may concern:*

Be it known that I, CHARLES R. HOPKINS, a citizen of the United States, residing at Dobbin, in the county of Grant and State of West Virginia, have invented or discovered certain new and useful Improvements in Shifting Mechanisms, of which the following is a specification, reference being had therein to the accompanying drawings.

This invention relates to mechanism for operatively connecting two non-parallel shafts whereby angular or rocking movements of one of said shafts will produce relative movement of the two shafts in a direction parallel to the axis of the other. The mechanism is primarily designed for, although not necessarily limited to use in connection with saw mill carriages for effecting the offsetting of the carriage with reference to the saw, as is usually required in such devices.

The invention has for its general object to provide a simple, practical, efficient and inexpensive device of this character, and more particularly to provide such a device which may be readily applied to saw mill carriages or other mechanisms without material modification of the structure to which it is applied, and which has no wearing parts which are not easily adjustable to take up lost motion.

Figure 1:
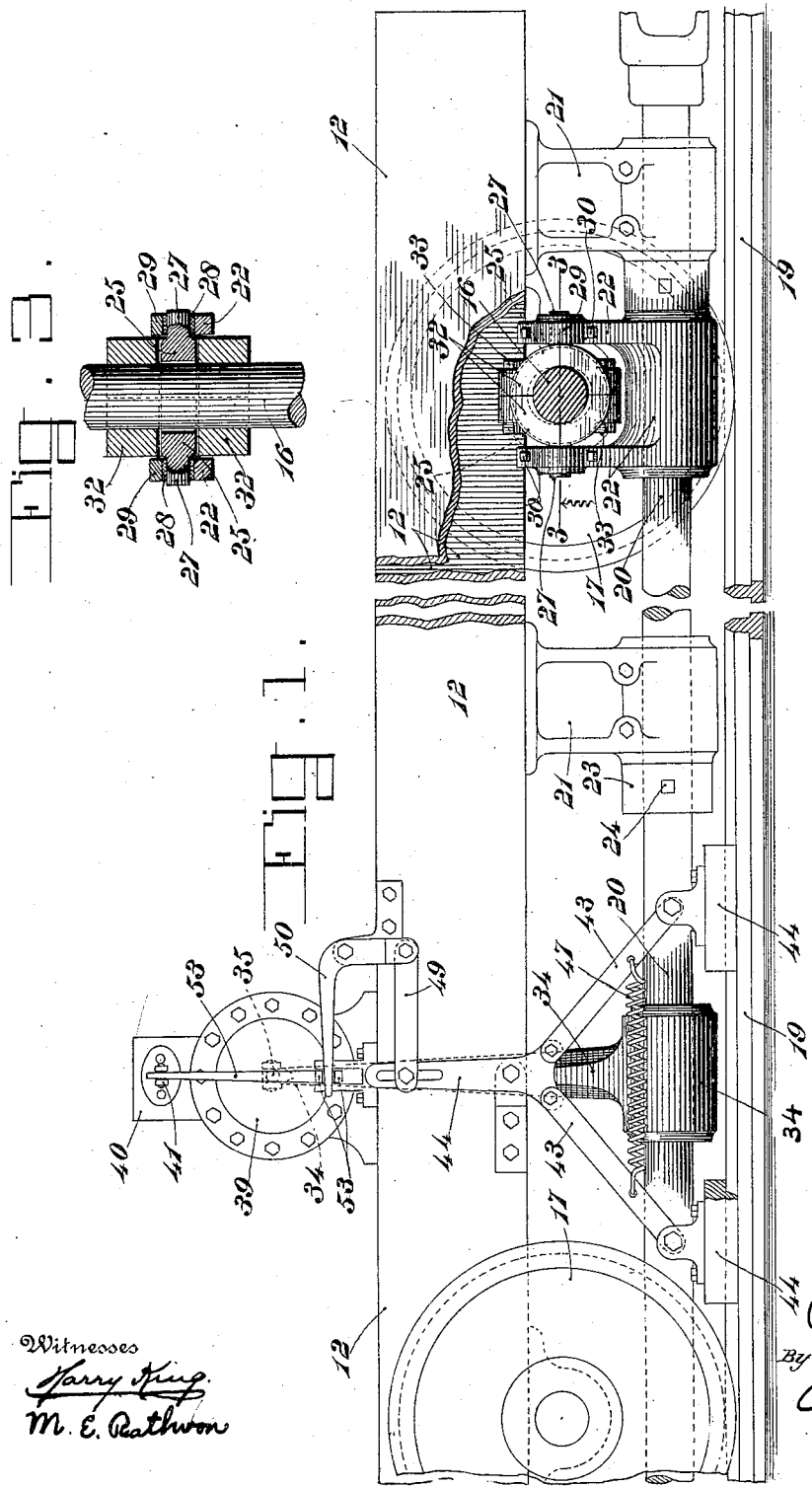
Figure 2:
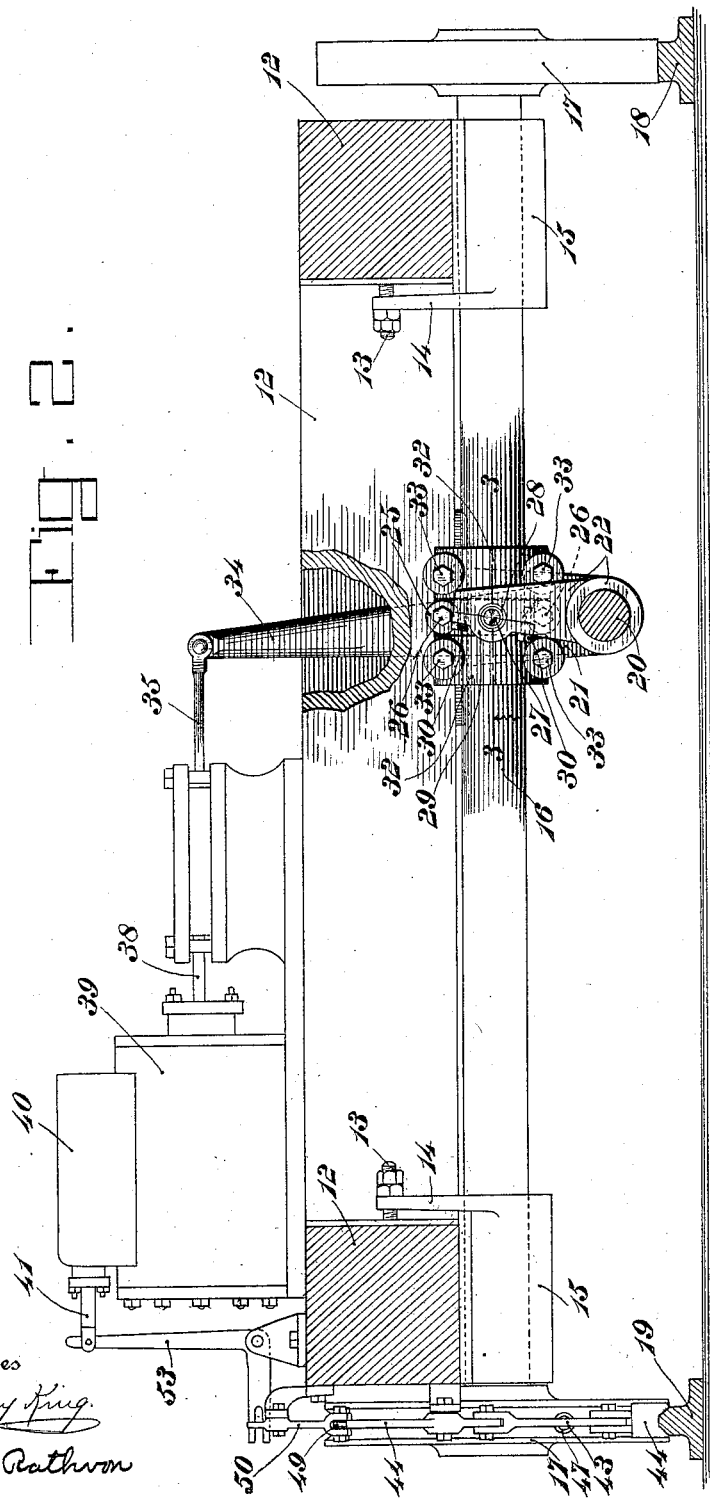

The foregoing and other objects of the invention, together with means whereby the same may be carried into effect, will best be understood from the following description of one form or embodiment thereof illustrated in the accompanying drawings, in which:

Figure 1 is a side elevation, partly broken away, of a portion of a saw-mill carriage having the present invention applied thereto. Fig. 2 is a transverse section thereof. Fig. 3 is a detail section on the lines 3—3, Figs. 1 and 2.

For convenience the invention is herein shown as applied to a saw-mill carriage offshown and off-set mechanism of the character disclosed and claimed in Letters Patent No. 1,122,755, granted Dec. 29, 1914, of the application for which this case is a division.

Referring to the drawings, 12 denotes the carriage frame to which are secured, as by bolts 13, brackets 14 having sleeve or bearing portions 15 in which are journaled the axles 16 of the carriage wheels 17. The sleeves or bearings are slidably mounted on the axles 16, which are of sufficient length to permit a slight lateral movement of the frame 12 upon said axles. The wheels 17 run upon a suitably disposed track which, as is usual in such apparatus, comprises a flat rail 18 and a V-shaped rail 19, the peripheries of the several wheels being suitably formed to coöperate with said rails respectively.

20 denotes a rock shaft extending longitudinally of the carriage, or transverse to the axles 16, beneath said axles, said shaft being journaled in hangers 21 bolted to and depending from the frame 12. The shaft 20 is preferably held against longitudinal movement by means of collars 23 secured to said shaft, as by set screws 24, and which collars engage certain of the hangers 21.

22 denotes yokes keyed or otherwise fixed on the shaft 20 adjacent to the axles 16 and having arms arranged at opposite sides of said axles respectively.

25 denotes collars loosely or rotatably mounted on the axles 16 adjacent to the yokes, said collars being formed in sections and being removably held in assembled position about said axles by means of bolts 26 which pass through perforated ears formed in the several sections. The collars 25 are provided with trunnions 27 mounted in bushings 28 which are clamped to the arms of the yokes 22 by means of cap plates 29, detachably secured to said arms, as by bolts 30. By removing the caps 29 the bushings 28 may be removed and replaced when necessary by reason of the wear of the parts.

32 denotes normally fixed collars also formed in sections detachably clamped in place on the axle 16 by bolts 33 which pass through perforated ears formed on the sections of said collars. The collars 32 are arranged in pairs on opposite sides of the collars 25, respectively, and hold said last named collars against longitudinal movement on the axles 16. By suitably adjusting the position of the collars 32, wear between said collars and the collars 25 may be readily taken up. The sectional or detachable character of the collars 25 and 32 makes it possible to apply this portion of the mechanism to the axles of any existing carriage, or to any similar shaft of any other mechanism, without disassembling said carriage or other mechanism in any way. Each of the collars 25 with its trunnions 27 being held against movement longitudinally of the axle or other shaft 16, it will be seen that the upper ends of the arms of the corresponding yoke 22 are held against movement transversely of the carriage or longitudinally of the axle or shaft 16, so that rocking of the shaft 20 will cause said shaft to move bodily transversely of the carriage, and by reason of the fact that said shaft is mounted in journals fixed to the frame 12, will cause said frame to be shifted transversely or moved longitudinally of the axle 16.

In order to permit a vertical movement of the trunnions 27 and collars 25, or a movement in a plane transverse to the shaft or axle 16, such movement being necessitated by the rocking movement of the arms of the yokes 22, the collars 25 are made of an interior diameter slightly greater than the exterior diameter of the axle 16. In other words the said collars have a loose fit laterally of the said axle so as to be capable of slight lateral movements relative to said shaft or axle.

While in the embodiment of the invention chosen for illustration the frame 12, in which the rock shaft 20 is journaled, is shown as laterally movable on the axles or shafts 16, it will be seen that the means herein shown for connecting the shafts 16 and 20 is by no means limited to this particular use. For example, with the frame 12 stationary and the bearings 15 and 21 of the shafts 16 and 20, respectively, correspondingly fixed, the mechanism described might be employed for shifting the shaft 16 longitudinally in its bearings without interfering with the free rotation of said shaft. In other words, the movement transmitted by the connecting devices shown is a relative one in the direction of the length or axis of the freely rotating shaft.

The means employed for rocking the shaft 20 are immaterial so far as the present invention is concerned, but, as herein shown, comprise an operating arm 34 fixed to the shaft 20 and connected by a pitman 35 with the piston rod 38 of a piston (not shown) in a steam or other fluid pressure cylinder 39 mounted on the frame 12. The admission of fluid pressure to the opposite ends of the cylinder 39 is controlled by means of an ordinary slide valve (not shown) in a valve box 40 mounted on the cylinder 39 and to which steam or other fluid pressure may be supplied from any suitable source, said valve being provided with a stem 41 projecting from said valve box. The means herein shown for operating the valve comprise a pair of friction shoes 42 mounted to slide on the rail 19 and connected by links 43 to a lever 44. The links 43 are connected by a spring 47 which, by drawing said links toward one another, acts to press the shoe 42 against the rail 19. The upper arm of the lever 44 is connected by means of a link 49 to one arm of a bell crank lever 50. The upper arm of the lever 50 engages at its end the bifurcated end of one arm of a second bell crank lever 53 whose other arm is pivoted to the valve stem 41.

When the direction of travel of the carriage is reversed, frictional engagement of the shoes 42 with the rail 19 will cause reversal of the movement of said shoes to be momentarily retarded, thereby causing the lever 44 to be turned on its pivot in one direction or the other and, through the connections described, causing the controlling valve to be shifted, the piston to be moved in one direction or the other, and the shaft 20 to be rocked in its bearings in the hangers 21. The valve operating mechanism last referred to is, however, not claimed herein as it forms no portion of the present invention, being covered by the claims of my Patent No. 1,122,755, hereinbefore referred to.

Having thus described my invention, I claim:

1. The combination with a shaft and a bearing in which said shaft is rotatably mounted, said shaft and bearing being relatively movable longitudinally of said shaft, of a rock-shaft arranged transverse to said first-named shaft, yokes fixed to said rock-shaft, a collar of greater interior diameter than said first named shaft so as to be capable of relative movement transverse to its shaft, said collar being formed in two detachable parts and being provided with trunnions held in the arms of said yoke, and means for holding said collar against longitudinal movement on its shaft.

2. The combination with a shaft and a bearing in which said shaft is rotatably mounted, said shaft and bearing being relatively movable longitudinally of said shaft, of a rock-shaft arranged transverse to said first named shaft, a yoke fixed to said rock-shaft, a collar of greater interior diameter than said first-named shaft so as to be capable of relative movement transverse to its shaft, said collar being formed in two detachable parts and being provided with trunnions held in the arms of said yoke, and fixed collars on said first-named shaft on opposite sides of said first-named collar.

3. The combination with a shaft and a bearing in which said shaft is rotatably mounted, said bearing and shaft being relatively movable longitudinally of said shaft, of a rock-shaft arranged transverse to said first-named shaft, a yoke fixed to said rock-shaft, a collar of greater interior diameter than said first-named shaft so as to be capable of relative movement transverse to its shaft, said collar being formed in two detachable parts and being provided with trunnions, means for holding said collar against longitudinal movement on its shaft, bushings in which said trunnions are journaled, and caps detachably secured to the arms of said yoke for clamping said bushings to said arms.

4. The combination with a shaft and a bearing in which said shaft is rotatably mounted, said shaft and bearing being relatively movable longitudinally of said shaft, of a rock-shaft arranged transverse to said first-named shaft, a yoke fixed to said rock-shaft, a collar of greater interior diameter than said first-named shaft so as to be capable of relative movement transverse to its shaft, said collar being formed in two detachable parts and being provided with trunnions, fixed collars on said first-named shaft on opposite sides of said first-named collar, each of said fixed collars being also formed in two detachable parts, bushings in which said trunnions are journaled, and caps detachably secured to the arms of said yoke for clamping said bushings to said arms.

In testimony whereof I affix my signature, in presence of two witnesses.

CHARLES R. HOPKINS.

Witnesses:
 C. E. FIDLER,
 R. I. MORRISON.

Copies of this patent may be obtained for five cents each, by addressing the "Commissioner of Patents, Washington, D. C."